March 1, 1932.  C. LAMB  1,847,218
HOSE AND COUPLING ASSEMBLY
Filed Sept. 30, 1929
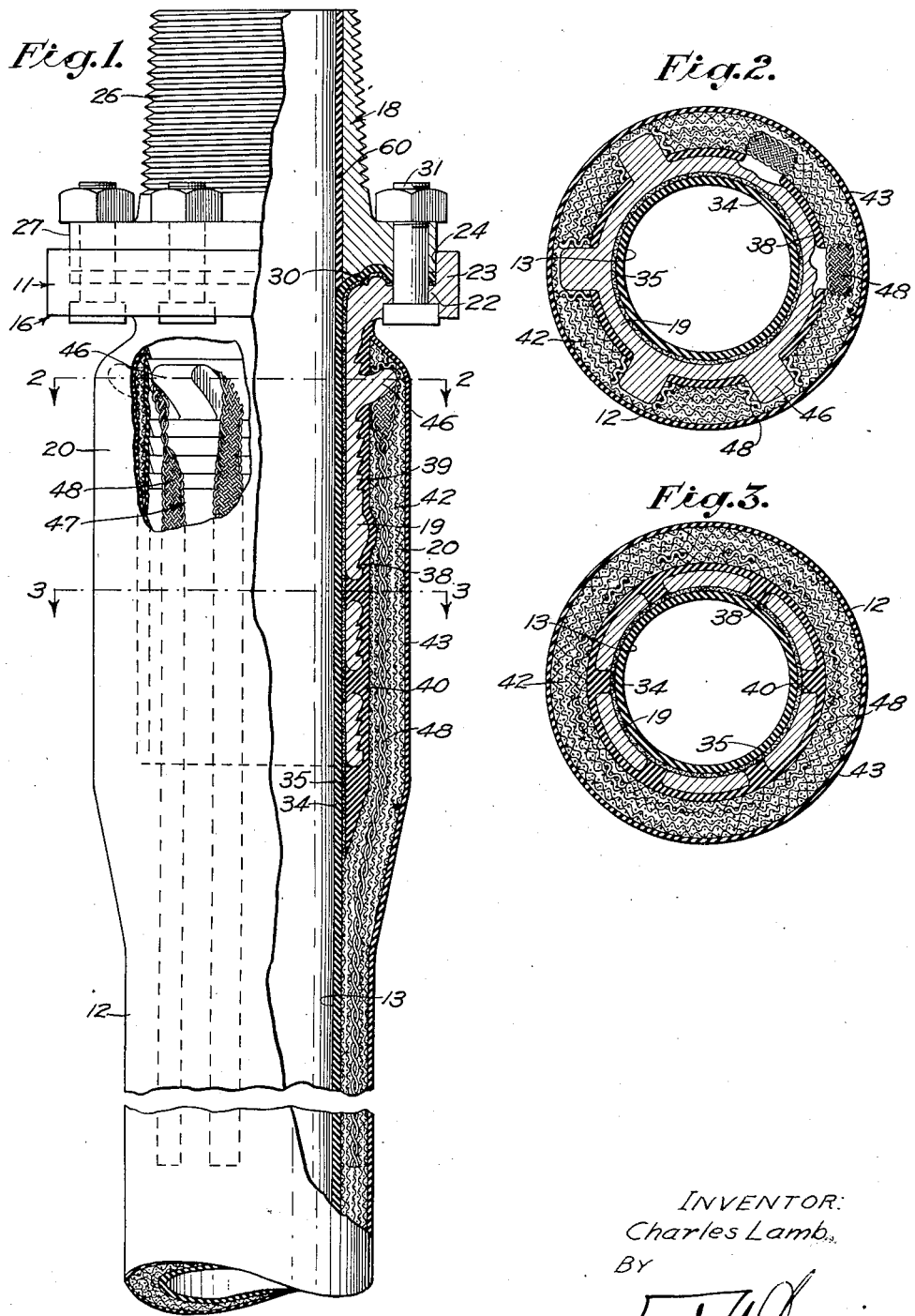
INVENTOR:
Charles Lamb,
BY
ATTORNEY.

Patented Mar. 1, 1932

1,847,218

UNITED STATES PATENT OFFICE

CHARLES LAMB, OF LOS ANGELES, CALIFORNIA

HOSE AND COUPLING ASSEMBLY

Application filed September 30, 1929. Serial No. 396,305.

My invention relates to high pressure hose and coupling assemblies which find particular utility in the well-drilling industry where they are used to connect a rotary hose between a rotary mud pump and a swivel of a rotary drilling apparatus so that rotary mud under considerable pressure may be supplied to the drilling tools during the drilling operation.

The rotary hose and couplings are often subjected to pressures as high as one thousand pounds per square inch. Due to this great pressure, it is very difficult to provide satisfactory joints between the hose and couplings. One of the usual constructions for joints of this class is to provide a coupling having a sleeve or nipple which is inserted into the end of the hose. Clamps are then placed around the hose so as to force the hose into intimate contact with roughened projections on the nipple and thus prevent the hose from becoming detached therefrom when pressure is applied.

There are several disadvantages of this type of joint. The hose is usually stretched and weakened when the nipple is inserted in it. A joint is also formed between the hose and the end of the nipple and when this joint is subjected to the pressure of a fluid in the hose, the fluid is forced into the joint, weakening the hose and eventually causing leakage. The hose is also weakened and caused to leak at a point adjacent the end of the nipple since it is at this point that the greatest bending moment occurs. There is also danger of the hose separating from the nipple.

My invention comprehends a construction for a joint of this class in which leakage is prevented by having the coupling brought into intimate contact with the roughened projections by being intermeshed with the end of the hose, such as by being molded so that the surface of the hose conforms to the contours of the surface of the nipple and is gripped thereby.

It is also an object of my invention to provide a construction for a joint of the above class wherein the coupling and hose are prevented from separating by the use of a tying member secured to the coupling, the tying member extending longitudinally of the hose and being embedded in the hose.

Another object is to provide a construction of this class in which a leak-proof seal is provided between the hose and the coupling, the seal being secured by a novel cooperation between the hose and coupling in which the hose is used as packing to seal the joint between primary and secondary members of the coupling.

Another object of my invention is to provide a construction for a seal of the above class in which a fluid pressure in the coupling is used to pack the packing in the joint.

Further objects and advantages of my invention will be evidenced in the following description.

In the drawings:

Fig. 1 is a partially sectioned view of a hose and coupling assembly of my invention.

Fig. 2 is a sectional view taken on the line 2—2 of Fig. 1.

Fig. 3 is a sectional view taken on the line 3—3 of Fig. 1.

In Fig. 1 I have shown a coupling 11 for connecting a rotary hose 12 to a swivel of a rotary drilling rig (not shown) so that rotary mud may be supplied through a central fluid opening 13 in the hose 12 and coupling 11. As best shown in Fig. 1, the coupling 11, which I have illustrated, is of the half-hose type and consists of a primary coupling member 16 adapted for connection to the rotary hose 12 and a secondary coupling member 18 suitably secured to the primary member 16 and adapted to be connected to the rotary drilling rig.

The primary member 16 includes a sleeve or nipple 19, to which the hose 12 is connected by a joint 20 of my invention, an annular flange 22 at one end of the nipple 19 and a peripheral wall 23 around the flange 22, the wall 23 and flange 22 forming a circular opening 24 at one end of the primary member 16.

The secondary member 18 includes a threaded sleeve 26 for attachment to the swivel and an annular flange 27 formed at one end of the sleeve 26, the flange 27 being adapted to fit closely into the circular opening 24 in the primary member 16 and to form with the flange 22 and wall 23 a packing space 30, which is open to the central, longitudinal opening 13 formed by the sleeve 26 and nipple 19 and closed to the outside of the coupling 11 by the wall 23. The flanges 22 and 27 are compressed together by bolts 31 passing therethrough so as to secure the primary and secondary members 16 and 18 together and to compress in the packing space 30 any packing material which may be inserted therein.

The manner of securing the hose 12 to the coupling 11 is a very important feature of my invention. As best shown in Fig. 3, the hose may be of the high pressure type having an inner layer of rubber 34, outside of which is a layer of fabric such as canvas or duck 35. The layers of rubber and canvas 34 and 35 are extended longitudinally through the opening 13 and the ends thereof are flared outward and inserted into the packing space 30 so as to be clamped by the bolts 31 and to seal the joint between the primary and secondary coupling members 16 and 18, the layers of rubber and canvas being prevented from being squeezed outward from between the primary and secondary members 16 and 18 when the bolts 31 are tightened by the use of the wall 23 which closes the outside of the packing space 30.

Extending around the nipple 19 is a body of rubber 38 which may be molded so as to conform to and intimately engage projections 39 on the surface of the nipple 19 and to fill openings 40 therein. The body of rubber 38 extends below the nipple 19 and the lower edges thereof are beveled to provide a smooth junction between the rubber 38 and the canvas 35. The hose 12 also has layers of fabric 42 outside the canvas 35 and an outer layer of rubber 43 over the layers of fabric 42, the layers of fabric and rubber 42 and 43 being enlarged at the upper ends thereof to extend around the body of rubber 38 and nipple 19.

At the upper end of the nipple 19 are projections 46 which serve as an attaching means for a tying means 47 of my invention. The tying means 47 comprises strips 48 of woven wire cloth, which are made from a high tensile strength wire such as piano wire and which are looped over the projections 46 so as to be supported thereby. The free ends of the tying means 47 extend longitudinally of the hose 12 between the layers of fabric 42 and may be secured thereto by weaving the fabric with the strips 48 or by imbedding the strips 48 between the layers of fabric 42 when fabricating the hose. The lower ends of the tying means 48 extend below the lower end of the nipple 19 so as to strengthen the hose 12 at this point and prevent an elongation thereof which would result in a failure.

As best shown in Fig. 1 we provide a layer of rubber 60 on the inside of the secondary coupling member 18, which layer of rubber 60 may be moulded in place and is used to prevent a fluid in the opening 13 from coming into frictional contact with the metallic coupling member 18. This prevents the formation of static electricity which might cause a fire to be started thereby.

It should be noted that by extending the inner layers 34 and 35 of the hose inside the nipple 19 and by clamping the ends thereof between the coupling members 16 and 18, I provide a continuous strip of hose fabric inside the nipple 19 and thus prevent the formation of a joint at which there might be leakage. The only joint which is exposed to a fluid in the fluid opening 13 is the joint between coupling members 16 and 18. This joint is packed by the use of the inner layers 34 and 35 of the hose as a packing member and the packing is clamped by the bolts 31. By providing a wall 23 which closes the packing space 30 on the outside of the coupling 11 and by providing a packing space 30 which is open to the fluid opening 13 on the inside of the coupling 11, the ends of the layers 34 and 35 which extend outward so as to form flanges may be placed under considerable mechanical pressure when the bolts 31 are tightened. By this form of seal there can be no leakage at the joint between the members 16 and 18 which comprise the coupling. If the layers 34 and 35 were not extended outward between the two members 16 and 18, it would be possible for the fluid in the hose, which in rotary drilling is under a pressure as high as 1500 lbs., to force the layers 34 and 35 from the coupling member 16 and to eventually result in a leakage and possibly a separation of the hose from the coupling. It will be readily seen that should such a separation occur, the ends of the hose would fly around in the derrick and cause considerable damage and, possibly, injury to the workmen in the derrick. The inner layers 34 and 35 are rubber and duck, respectively, and are pliable and yieldable so that when a pressure occurs in the hose these two layers are forced outward into pressural contact with the nipple 19. It will be seen that the pressure of engagement between the portion of the hose which extends inside the nipple 19 and the inner wall of the nipple 19 is governed by the pressure of the fluid in the hose. When a high pressure exists in the hose, a more secure attachment of the nipple and the hose is desired. This is more or less automatically taken care of in the hose and coupling assembly of my invention, since the pressure of engagement between the hose and the nipple increases with the pressure of the fluid in the hose. It will be obvious that when the pressural engagement of the layers 34 and 35 and the nipple 19 increases, the securing of these two members together is made stronger. In the form of the invention illustrated in the drawings only one layer of duck and one layer of rubber are extended within the nipple 19. Obviously it is within the scope of the invention to extend a greater portion of the hose inside the nipple 19.

The use of the longitudinal tying means 47 is another important feature of my invention. Heretofore, no great difficulty has been experienced in providing hose and couplings which will withstand high tangential forces tending to burst the hose, but difficulty has been experienced in providing a construction which will withstand longitudinal forces tending to separate the hose and couplings. By providing tying means which are secured to the nipple 19 and which extend longitudinally of the hose 12, the hose and coupling are prevented from separating and the longitudinal forces are transmitted to the layers of fabric 42 which layers are the strongest part of the hose 12 and, since the fabrics extend for a considerable distance longitudinally of the hose, the forces are distributed through a considerable portion of the hose. The portion of the hose which usually fails is the part adjacent the end of the nipple which is inserted in the hose, since it is at this point that the greatest bending moment occurs. I, therefore, extend the tying means 47 beyond the end of the nipple 19 so as to strengthen the hose 12 at this point.

The use of a coupling member 16 which is molded or vulcanized in the end of the hose 12 is also advantageous in preventing leakage between the hose 12 and coupling 11. As stated before, my invention comprehends a method of intermeshing the parts of the nipple 19 and the hose 12 or the hose 12 and the tying means 47 so that the parts thereof are brought intimately into contact, as is done when the parts are molded or woven.

It should be understood that I am not limited to the particular form of my invention as shown and described, as various modifications may be made therein. The coupling 11 may be a coupling for securing together two lengths of hose. Tying means 47 other than that shown may be used and the tying means secured to the nipple 19 by other means than the projections 46 which are shown. These and other modifications may be made without departing from the spirit of my invention. As will be obvious from the appended claims, I do not intend my invention to be limited to a combination including the tying means. The tying means is utilized as a precaution and would prevent a separation of the hose and nipple under some abnormal condition which ordinarily does not exist. Under ordinary conditions the hose and coupling assembly will remain secured together without the use of the tying means.

I claim as my invention:

1. In combination: a hose coupling comprising primary and secondary coupling members; means for clamping said primary and secondary coupling members together; and a hose having an end thereof vulcanized to one of said coupling members and having a portion thereof clamped between said primary and secondary coupling members.

2. In combination: a hose coupling comprising primary and secondary coupling members; means for clamping said primary and secondary coupling members together; a nipple on one of said coupling members; and a hose having laminations and having an end thereof in which said nipple is embedded and having a portion extending inside said nipple and clamped between said primary and secondary coupling members.

3. In combination: a hose coupling comprising primary and secondary coupling members; means for clamping said primary and secondary coupling members together; means on one of said coupling members for forming a packing space between said coupling members, said space being open to the interior of said coupling and closed to the exterior thereof; and a hose composed of laminations, and having an end thereof in which a part of one of said coupling members is embedded and having a portion thereof extending into said packing space.

4. In combination: a hose coupling comprising primary and secondary coupling members; means for clamping said primary and secondary coupling members together; means on one of said coupling members for forming a packing space between said coupling members, said space being open to the interior of said coupling; a nipple on one of said coupling members; and a hose having an end thereof vulcanized to said nipple and having a portion thereof extending inside said nipple and into said packing space.

5. In combination: a hose coupling member; a hose having an end thereof vulcanized to said coupling member; and tying means secured to said coupling member, said tying means being embedded in said hose and extending longitudinally thereof.

6. In combination: a hose coupling member; a nipple on said coupling member; a hose surrounding an end of said nipple, said hose being vulcanized to said nipple; and tying means secured to said coupling member and embedded in said hose.

7. In combination: a hose coupling comprising primary and secondary coupling members; means for clamping said primary and secondary coupling members together; a hose having an end thereof in which a part of said primary coupling member is embedded and having a portion thereof clamped between said primary and secondary coupling members; and tying means secured to said primary coupling member, said tying means being embedded in said hose and extending longitudinally thereof.

8. In combination: a hose coupling comprising primary and secondary coupling members; means for clamping said primary and secondary coupling members together; a nipple on one of said coupling members; a hose having an end in which said nipple is vulcanized and having a portion thereof extending inside said nipple and clamped between said primary and secondary coupling members; and tying means secured to said nipple, said tying means being vulcanized in said hose.

9. In combination: a hose coupling comprising primary and secondary coupling members; means for clamping said primary and secondary coupling members together; a hose having an end thereof vulcanized to said primary coupling member and having a portion thereof clamped between said primary and secondary coupling members; tying means embedded in said hose and extending longitudinally thereof; and means for securing said tying means to said primary coupling member.

10. In a hose and coupling assembly the combination of: a hose composed of laminations, said hose being susceptible of enlarging in diameter when a fluid under pressure is carried therein; and a coupling member having a portion which is embedded and vulcanized in the end portion of the wall of said hose and which surrounds at least a part of said laminations of said hose, the pressure of the fluid in said hose causing the portion of said hose within the said portion of said coupling member to be expanded into pressural engagement with the said portion of said coupling member.

11. In a hose and coupling assembly the combination of: a hose composed of laminations, said hose being susceptible of enlarging in diameter when a fluid under pressure is carried therein; and a coupling member having a portion which surrounds at least a part of said laminations of said hose, the pressure of the fluid in said hose causing the portion of said hose within the said portion of said coupling member to be expanded into pressural engagement with the said portion of said coupling member, said end portion of said hose being flared outward at the outer end of said coupling member.

12. In a hose and coupling assembly the combination of: a hose composed of laminations of duck and rubber, said hose being susceptible of enlarging in diameter when a fluid under pressure is carried therein; and a coupling member having a portion which surrounds at least a part of said laminations of said hose and vulcanized thereto, the pressure of the fluid in said hose causing the portion of said hose within the said portion of said coupling member to be expanded into pressural engagement with the said portion of said coupling member.

13. In a hose and coupling assembly the combination of: a primary coupling member having a nipple and having a recess which extends outward from the opening of said nipple; and a hose having a portion extending through said opening of said nipple and having a flange portion which extends outward into said recess, said portion of said hose extending through said opening of said nipple being expansible under pressure and being caused to pressurally engage said nipple when a fluid pressure exists in said hose.

14. In a hose and coupling assembly, the combination of: a coupling having a nipple; and a laminated hose having an inner part extending inside said nipple and being vulcanized thereto, and having an outer part which surrounds said nipple and is vulcanized thereto.

15. In a hose and coupling assembly, the combination of: a coupling having a nipple; and a laminated hose having an inner part extending inside said nipple and having an outer part surrounding said nipple, said hose containing a vulcanizable material and being vulcanized to said nipple.

16. In a hose and coupling assembly, the combination of: a coupling having a nipple; and a laminated hose, said hose being connected to said nipple so that said nipple is embedded in the wall of said hose and said hose being vulcanized to said nipple.

17. As a new article of manufacture: a laminated hose; and a coupling member having a nipple vulcanized within the wall of said laminated hose between the laminations thereof.

In testimony whereof, I have hereunto set my hand at Los Angeles, California, this 25 day of September, 1929.

CHARLES LAMB.